UNITED STATES PATENT OFFICE.

JOHN ROY MASSON, OF WANDONG, VICTORIA, AUSTRALIA.

WET PROCESS OF RECOVERING ANTIMONY IN A PURE STATE FROM ORES, CONCENTRATES, TAILINGS, AND SLIMES CONTAINING IT.

No. 890,432.

Specification of Letters Patent.

Patented June 9, 1908.

Application filed August 2, 1907. Serial No. 386,831.

*To all whom it may concern:*

Be it known that I, JOHN ROY MASSON, a subject of the King of Great Britain and Ireland, residing at Wandong, in the State of Victoria, Commonwealth of Australia, assayer and metallurgist, have invented an Improved Wet Process for the Recovery of Antimony in a Pure State from Ores, Concentrates, Tailings, and Slimes Containing It, of which the following is a specification.

This invention consists of an improved wet process for the recovery of antimony, in a pure state, from ores, concentrates, tailings and slimes containing it, the object being as stated to recover antimony, in a pure state, and by a continuous process, from the ores etc. containing it.

In carrying out my process the pulverized ore or material containing antimony is treated with a solution of caustic soda, caustic potash or any other alkali of the requisite strength hot or cold and by such means the antimony contents are dissolved. The said solution, containing the antimony, is now drawn off by filtration, decantation or other means and run into vats. To the solution when in the vats sulfuric acid is added until it becomes acidified thereby precipitating the antimony contained in the solution as sulfid owing to the liberation of the sulfureted hydrogen gas. The solution is then separated from the precipitate by filtration or other suitable means. This precipitate of sulfid of antimony is now mixed with clean sand or the like and chloridized by a stream of chlorin gas. The antimony (now in the form of chlorid of antimony) is washed out and the strongly acid liquor is run into vats or vessels and pieces of tin, copper, zinc, lead or iron are introduced into the solution. By this means the antimony held in solution is precipitated as pure antimony. I prefer to employ iron in said solution as it is much cheaper than the other metals mentioned, while the object of adding sand to the sulfid of antimony precipitate is to permit the gas to permeate through it, hence any other free leaching material may be employed in place of the sand.

The sulfid of antimony prepared according to my process is more easily attacked and dissolved by chlorin gas than is the native sulfid originally contained in the ore. Also I have found that by the use of the metals mentioned as precipitants pure antimony is recovered from the acid solution instead of the inferior quality of the sulfid of antimony at first recovered by the addition of sulfuric acid to the original alkaline solution.

Having now described my invention what I claim as new and desire to secure by Letters Patent is:—

1. In a process for the purpose specified chloridizing sulfid of antimony when mixed with sand or the like by means of a stream of chlorin gas and washing out the resulting chlorid of antimony and afterwards precipitating antimony in a pure state by the addition of a more electro positive metal.

2. The herein described process consisting in dissolving the antimonial contents of the material with a solution of a caustic alkali, recovering the antimony in solution as sulfid of antimony by the addition of sulfuric acid thereto, chloridizing the precipitated sulfid of antimony with chlorin gas, washing out the chlorid of antimony and precipitating the antimony contained in the solution as pure antimony by introducing pieces of a more electro positive metal.

In testimony whereof I have hereunto set my hand in presence of two subscribing witnesses.

JOHN ROY MASSON.

Witnesses:
 BEDLINGTON BODYCOMB,
 W. J. S. THOMPSON.